United States Patent
Paunov

(10) Patent No.: US 10,183,643 B2
(45) Date of Patent: Jan. 22, 2019

(54) TRANSPARENT VEHICLE PARTITION

(71) Applicant: Ranger Design, Montreal (CA)

(72) Inventor: Ilko Paunov, Laval (CA)

(73) Assignee: Ranger Design, Montreal, Quebec (CA)

(*) Notice: Subject to any disclaimer, the term of this patent is extended or adjusted under 35 U.S.C. 154(b) by 0 days.

(21) Appl. No.: 15/618,609

(22) Filed: Jun. 9, 2017

(65) Prior Publication Data

US 2017/0355338 A1    Dec. 14, 2017

Related U.S. Application Data

(60) Provisional application No. 62/347,679, filed on Jun. 9, 2016.

(51) Int. Cl.
    *B60R 21/02*    (2006.01)
(52) U.S. Cl.
    CPC ................ *B60R 21/026* (2013.01)
(58) Field of Classification Search
    CPC ................ B60R 21/026; B60J 1/00
    USPC ..................................... 296/24.43
    See application file for complete search history.

(56) References Cited

U.S. PATENT DOCUMENTS

| | | | |
|---|---|---|---|
| 5,246,261 A * | 9/1993 | McCormack | B60R 21/026 296/24.34 |
| 9,643,477 B2 * | 5/2017 | Mochizuki | B60J 3/007 |
| 9,937,889 B2 * | 4/2018 | Richter | B60R 21/026 |
| 2007/0013201 A1 * | 1/2007 | Wagner | B60N 2/3011 296/24.43 |
| 2007/0046071 A1 * | 3/2007 | Steiger | B62D 33/042 296/193.01 |
| 2013/0020824 A1 * | 1/2013 | Tinterow | B60H 1/00592 296/24.46 |
| 2017/0247005 A1 * | 8/2017 | Richter | B60J 1/00 |

FOREIGN PATENT DOCUMENTS

| | | | | |
|---|---|---|---|---|
| EP | 2502792 A1 * | 9/2012 | | B60R 7/04 |
| WO | WO-9606756 A1 * | 3/1996 | | B60R 21/026 |
| WO | WO-0050269 A1 * | 8/2000 | | B60R 21/026 |

* cited by examiner

*Primary Examiner* — Pinel E Romain
(74) *Attorney, Agent, or Firm* — William H. Honaker; Dickinson Wright PLLC

(57) ABSTRACT

A vehicle partition mounted in a vehicle for separating a driver's compartment and a cargo compartment. The partition has a perimeter defining the outer extent of the surface area. The perimeter is contoured to closely fit within the contoured surfaces of the vehicle. The partition has a top section and a bottom section. The top section is transparent over the entire expanse of the top section extending to the perimeter such that top section can be seen through without visual obstructions over the entire surface area of the top section.

9 Claims, 2 Drawing Sheets

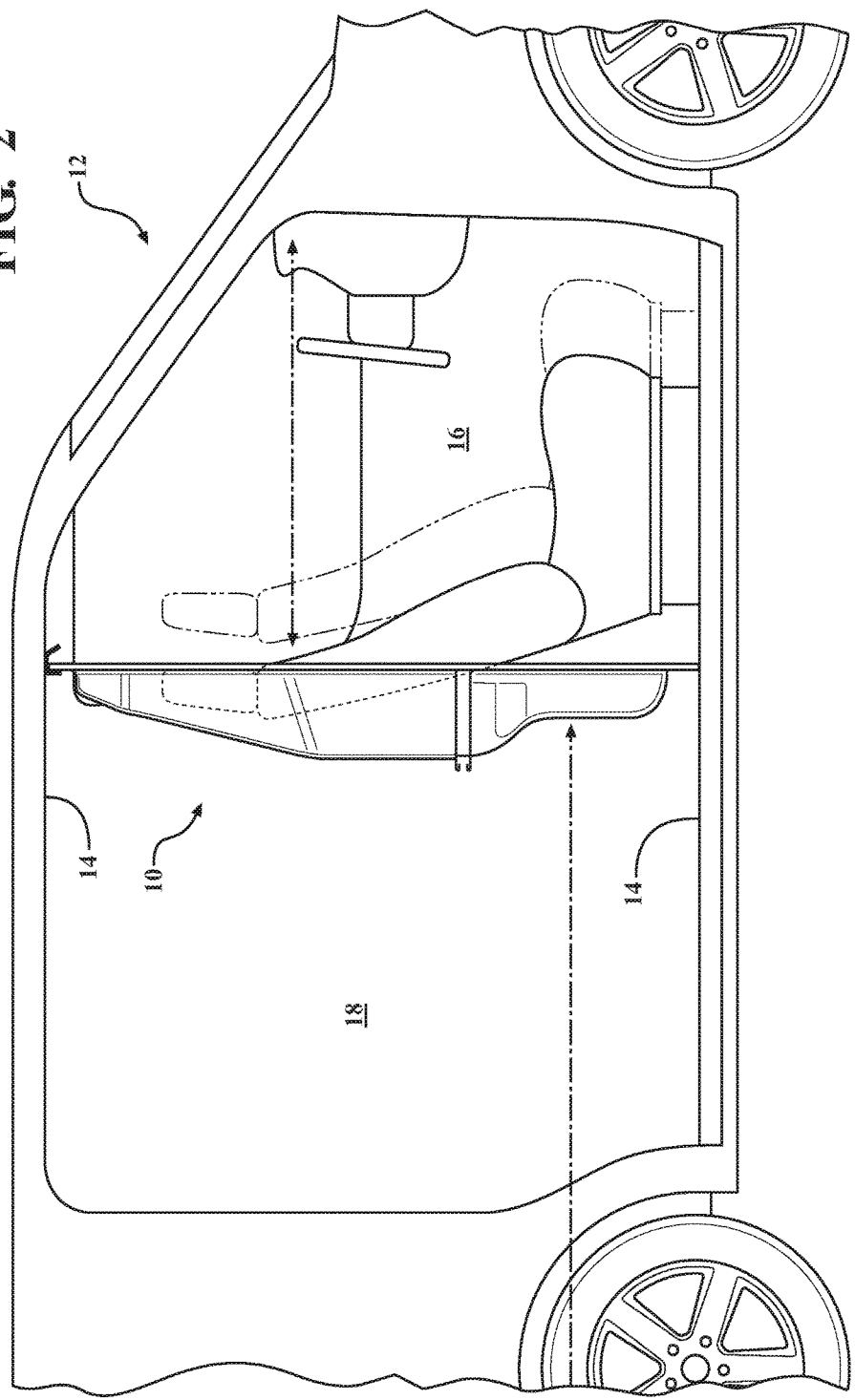

TRANSPARENT VEHICLE PARTITION

RELATED APPLICATIONS

This application claims the benefit of U.S. Provisional Application No. 62/347,679 filed on Jun. 9, 2016.

STATEMENT REGARDING FEDERALLY SPONSORED RESEARCH

NONE.

TECHNICAL FIELD

This invention relates generally to vehicle partitions used in commercial vehicles to separate the driver's compartment from the cargo compartment.

BACKGROUND OF THE INVENTION

Vehicle partitions are commonly used in vehicles to separate the driver's compartment from the cargo compartment. Partitions primarily keep the contents in the cargo compartment from inadvertently entering the driver's compartment. As will be appreciated, a sudden vehicle stop could result in the contents of the cargo department entering the driver's compartment. Such an occurrence could result in injury to the driver, distraction of the driver, etc.

Known vehicle partitions are typically made of metal and are mounted very close to the vehicle seats. The typical metal partition is generally a vertical wall extending between the walls, ceiling, and floor of the vehicle. These typical cargo van dividers make the cab feel constricted producing a boxed-in feeling. They can also restrict seat movement within the driver's compartment adding to the boxed-in feeling.

Many known vehicle partitions are solid which prevents cargo space viewing from the driver's compartment and creates driver blind spots. They also restrict light into the driver compartment. Even if an opening or window is provided, they are small and limit cargo space viewing, still result in blind spots and let little light into the driver compartment.

Another problem with typical vehicle partitions is that they are drafty and make climate control of the vehicle difficult. The metal partitions do not fit snugly against the contours of the vehicle. A still further problem is that the partitions rattle.

SUMMARY OF THE INVENTION

In general terms, this invention provides a partition with a top portion molded out of a transparent polycarbonate and a lower portion molded out of ABS plastic. The partition is thermoformed to snugly fit the interior contours of a vehicle, such as for example a cargo van. The polycarbonate and ABS provide a very strong partition. The partition's transparent top portion greatly enhances cargo space visibility, reduces blind spots, permits more light into the cab and creates the feeling of a more wide open, less claustrophobic cab space. The product's design allows the seats to travel to the full back position, and allows it to be precision fit against the walls, ceiling and floor of the vehicle which reduces drafts for improved cab climate control while reducing rattle noise.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 2 is a perspective view of the partition of the present invention.

DETAILED DESCRIPTION OF A PREFERRED EMBODIMENT

Figure 1:
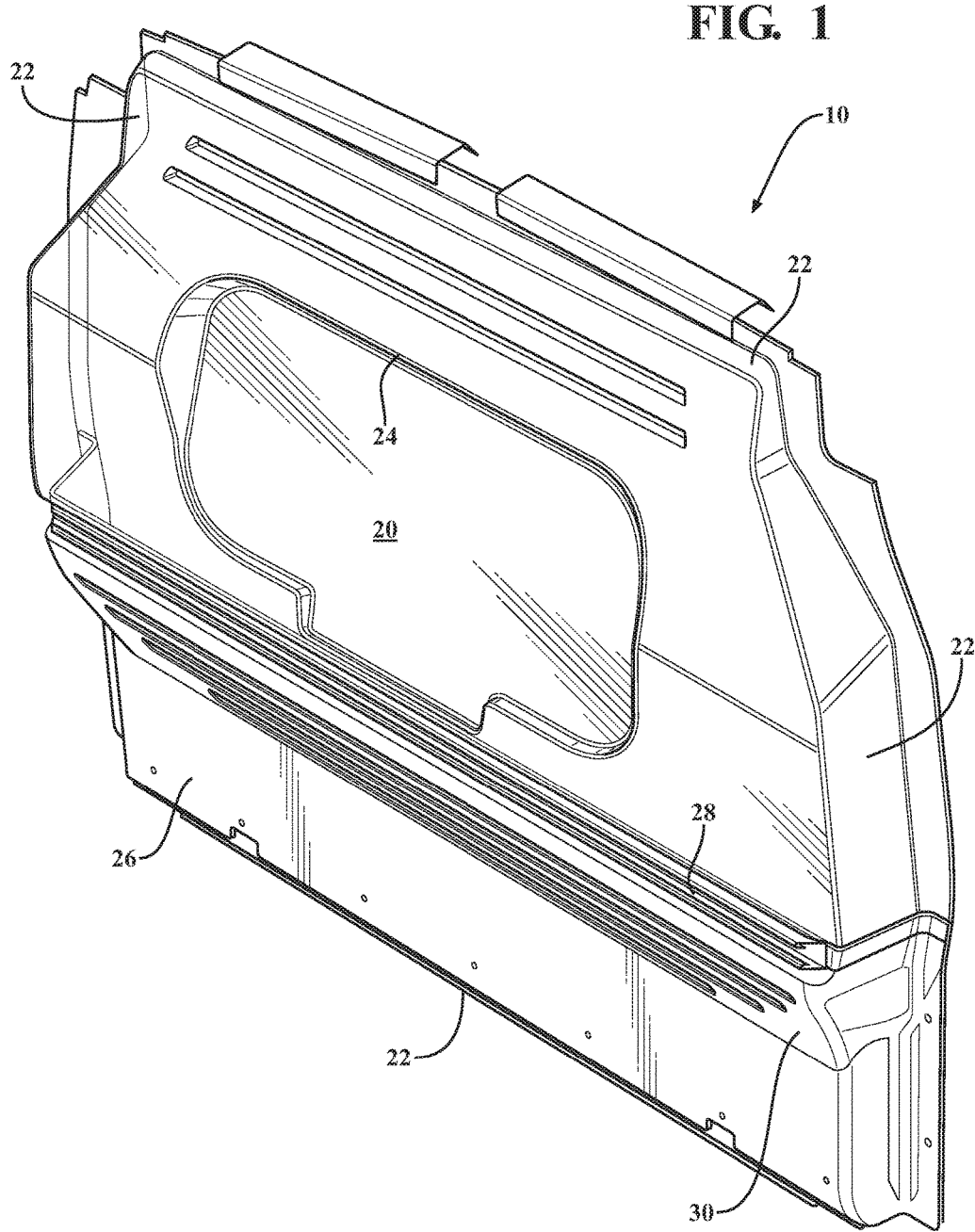
FIG. 1 is a cutaway view of the partition of the present invention mounted in a vehicle.

The vehicle partition of the present invention is shown generally at 10 in FIGS. 1 and 2. With reference to FIG. 2, an example of a vehicle 12 is illustrated with the partition 10 mounted in the vehicle 12. The vehicle 12 has an interior defined by countered surfaces 14. The contoured surfaces 14 include the top, bottom and side walls of the interior of the vehicle 12. The vehicle 12 includes a driver's compartment or cab 16 and a cargo compartment 18. The partition separates the driver's compartment 16 from the cargo compartment 18.

As illustrated in FIG. 1, the partition 10 spans the interior of the vehicle 12, extending between the sidewalls, the top and floor the vehicle 12. In the preferred embodiment, the partition 10 is thermoformed from a polycarbonate and an ABS plastic. The partition is configured so that the perimeter 22 snugly fits the contours of the vehicle 12. This reduces and in many installations completely eliminates drafts between the cargo and driver's compartments. The material and snug fit of the partition 10 also eliminates rattles which would occur with typical metal partitions.

The vehicle partition 10 has a surface area 20. A perimeter 22 defines the outer extent of surface area 20. The perimeter 22 is contoured to closely fit within the contoured surfaces 14 of the vehicle 12. The partition 10 has a top section 24 and a bottom section 26.

The top section 24 is transparent over the entire expanse of the top section 24 extending to the perimeter 22 such that top section 24 is see-through without visual obstructions over the entire surface area 20 of top section 24. The top section 24 is thermoformed from a clear polycarbonate.

The bottom section 26 as disclosed is formed from ABS plastic and can have any desired color. A mounting track 28 is attached to the bottom section 26 for receipt of for example mounting hooks or other accessories. The bottom section 26 also has a profile which includes a sloped ledge section 30 that protrudes outwardly from the remaining portion 32 of bottom section 26. The top section 24 mates with the sloped ledge section 30 and slopes upwardly and forwardly in the direction of the driver's compartment 16. This configuration provides additional space in the driver's compartment.

The partition 10 as disclosed has a mounting flange 32 protruding from the perimeter 22. The flange 32 has mounting holes for receipt of fasteners to secure the partition 10 within the vehicle 12.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A vehicle partition for use in a vehicle, the vehicle having an interior defined by contoured surfaces, a drivers compartment and a cargo compartment, said partition separating the drivers compartment from the cargo compartment, said vehicle partition comprising:
   a surface area;
   a perimeter defining the outer extent of said surface area, said perimeter is contoured to closely fit within the contoured surfaces of the vehicle; said partition having a top section and a bottom section; said top section being transparent over an entire expanse of said top section extending to said perimeter such that said top section can be seen through without visual obstructions over the entire surface area of said top section;
   said bottom section having a profile including a sloped ledge section protruding outwardly from the remaining portion of said bottom section; and
   wherein said top section mates with said sloped ledge section and slopes upwardly and forwardly toward said driver's compartment.

2. The vehicle partition of claim 1, wherein said partition is thermoformed from a polycarbonate and an ABS plastic.

3. The vehicle partition of claim 2, wherein said top section is thermoformed polycarbonate.

4. The vehicle partition of claim 2, wherein said bottom section is thermoformed ABS plastic.

5. The vehicle partition of claim 1, further including a mounting track attached to said bottom section for receipt of accessories.

6. The vehicle partition of claim 1, wherein said partition has a mounting flange protruding from said perimeter, said flange has mounting holes for receipt of fasteners to secure said partition within the vehicle.

7. A vehicle partition for use in a vehicle, the vehicle having an interior defined by contoured surfaces, a drivers compartment and a cargo compartment, said partition separating the drivers compartment from the cargo compartment, said vehicle partition comprising:
   a surface area;
   a perimeter defining the outer extent of said surface area, said perimeter is contoured to closely fit within the contoured surfaces of the vehicle; said partition having a top section made of thermoformed polycarbonate material and a bottom section made of thermoformed ABS material; said top section being transparent over an entire expanse of said top section extending to said perimeter such that said top section can be seen through without visual obstructions over the entire surface area of said top section;
   said bottom section having a profile including a sloped ledge section protruding outwardly from the remaining portion of said bottom section; and
   wherein said top section mates with said sloped ledge section and slopes upwardly and forwardly toward said driver's compartment.

8. The vehicle partition of claim 7, further including a mounting track attached to said bottom section for receipt of accessories.

9. The vehicle partition of claim 7, wherein said partition has a mounting flange protruding from said perimeter, said flange has mounting holes for receipt of fasteners to secure said partition within the vehicle.

* * * * *